(12) United States Patent
Meyer et al.

(10) Patent No.: US 6,956,465 B2
(45) Date of Patent: Oct. 18, 2005

(54) OCCUPANT DETECTION SYSTEM IN A MOTOR VEHICLE

(75) Inventors: Michael Meyer, Altdorf (DE); Harald Rudolf, Tuebingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/633,600

(22) Filed: Aug. 5, 2003

(65) Prior Publication Data
US 2004/0100283 A1 May 27, 2004

(30) Foreign Application Priority Data
Aug. 6, 2002 (DE) ................................ 102 35 881

(51) Int. Cl.[7] .............................................. B60Q 1/00
(52) U.S. Cl. .................. 340/425.5; 340/438; 340/439; 180/272; 280/735; 701/45
(58) Field of Search ........................ 340/573.1, 425.5, 340/438, 439; 180/272, 273; 280/735; 701/45, 701/46

(56) References Cited

U.S. PATENT DOCUMENTS

| 5,161,820 A | * | 11/1992 | Vollmer ................... 280/730.1 |
|---|---|---|---|
| 5,573,269 A | | 11/1996 | Gentry et al. ............... 280/735 |
| 6,199,902 B1 | | 3/2001 | Cooper et al. .............. 280/735 |
| 6,275,146 B1 | * | 8/2001 | Kithil et al. ............. 340/425.5 |
| 6,345,839 B1 | * | 2/2002 | Kuboki et al. .............. 280/735 |
| 6,452,870 B1 | * | 9/2002 | Breed et al. .................. 367/99 |
| 6,587,770 B1 | * | 7/2003 | Gray et al. .................... 701/45 |

FOREIGN PATENT DOCUMENTS

| DE | 40 16 610 A1 | 5/1990 |
|---|---|---|
| DE | 44 09 971 A1 | 3/1994 |
| DE | 195 47 842 A1 | 12/1995 |
| DE | 196 11 073 A1 | 3/1996 |
| DE | 199 07 199 A1 | 2/1999 |
| WO | WO 97/39920 | 4/1997 |

* cited by examiner

Primary Examiner—Anh V. La
(74) Attorney, Agent, or Firm—Crowell & Moring LLP

(57) ABSTRACT

An occupant detection system for a motor vehicle includes at least two occupant detection devices. A first occupant detection device is, for example, a seat occupancy or weight detection device arranged in the vehicle seat. The second occupant detection device comprises a first electrode arranged in the seat, and a second electrode arranged in the adjoining foot well. An electrical coupling variable is detected, and is used to determine a variable which characterizes an occupant, by means of an electrical field which is applied between the two electrodes.

17 Claims, 1 Drawing Sheet

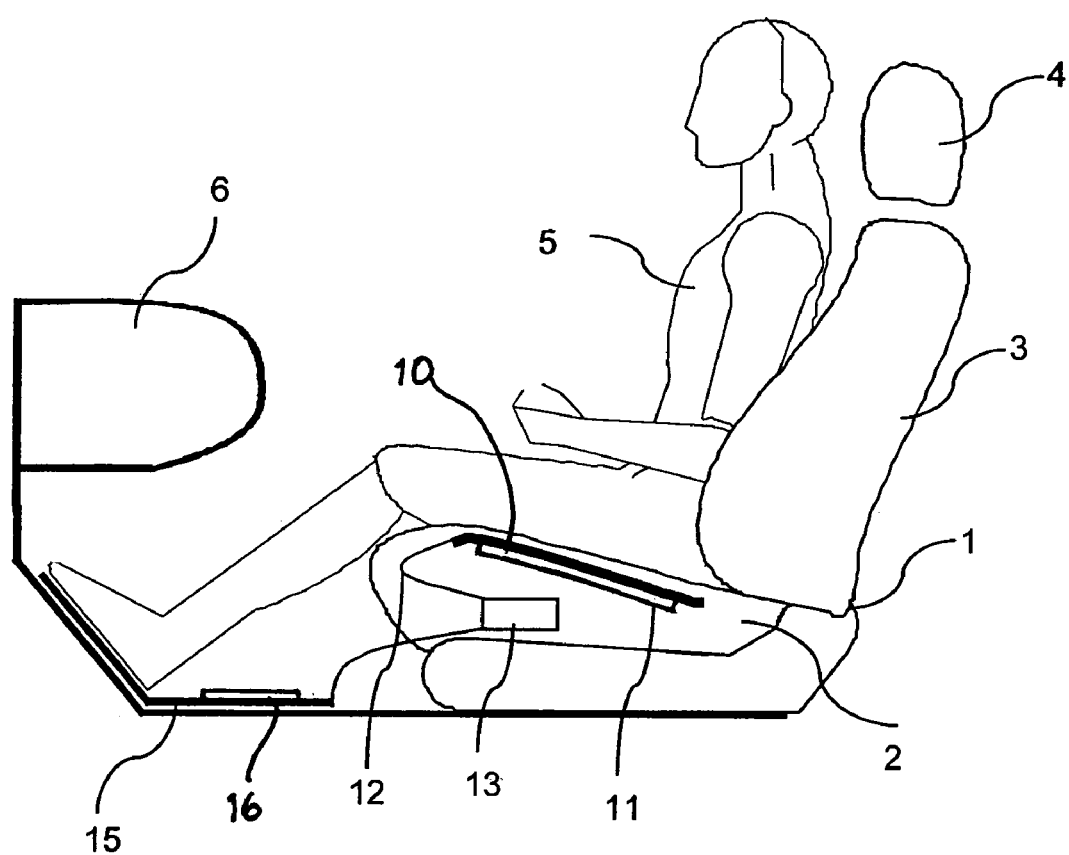

OCCUPANT DETECTION SYSTEM IN A MOTOR VEHICLE

BACKGROUND AND SUMMARY OF THE INVENTION

This application claims the priority of German patent document 102 35 881.8, filed 06 Aug. 2002, the disclosure of which is expressly incorporated by reference herein.

The invention relates to a motor vehicle occupant detection system.

Occupant protection systems in motor vehicles, particularly restraint systems, generally act on an occupant mechanically. Since the effect of restraint systems such as a safety belt, a belt tightener, a belt force limiter or an airbag can result in large mechanical forces on the occupant, the age, the constitution, the body size, the body mass and the load capability of an occupant are parameters which must be taken into account in order to achieve an optimum protection effect for activation of occupant protection systems.

In order to make it possible to match the operation of an occupant protection system in a motor vehicle, to a vehicle occupant, variables which characterize the occupant are detected by means of an occupant detection system. For example, force-sensitive electrical resistance elements or pressure-sensitive elements are arranged in a sensor mat in the vehicle seat surface for this purpose. Seat occupancy can be determined by means of such a sensor mat in a seat surface, and is used, for example, to determine whether a vehicle seat is occupied by an occupant, or whether only an object, such as a bag or case, is located on the seat. In addition, a weight class can be associated with a vehicle occupant.

An apparatus for child seat identification in a motor vehicle disclosed in German patent document DE 44 09 971 C2 comprises a seat occupancy sensor which is arranged in the seat and has an antenna integrated in it. The antenna is part of a transmitting and receiving unit which is associated with a child seat identification apparatus.

An occupant detection system which comprises a seat switch that closes when a mechanical load is applied to the seat surface is disclosed in DE 40 16 610 C2. When the seat contact switch is closed, it is assumed that a seat space is occupied by an occupant. In order to cover the special case of an occupant, particularly a child, who is standing in front of a seat, a further contact switch is arranged in the foot well of the vehicle, in addition to the seat contact switch. The two contact switches are designed independently of one another, so that the presence of a single closed switch results in the deduction that an occupant is present and, if appropriate, a restraint device which is associated with both switches is initiated. In order to distinguish between people and items of baggage, a force or pressure measurement apparatus is provided instead of a contact switch. It is also proposed that the presence of a person be determined by means of metal grids or loops, which are incorporated in the floor carpet, to detect a change in magnetic or electrical fields.

An occupant detection system in which the foot well is monitored for seat occupancy identification rather than using a weight or pressure sensor arranged in the seat is disclosed in German patent document DE 196 11 073 A1. For this purpose, an optical sensor, an acoustic sensor, an ultrasound sensor or an infrared sensor is used to detect whether there are any legs in the foot well.

An occupancy detection system of this generic type and which comprises a weight sensor arranged in the seat and two or more additional sensor elements arranged in the foot well, is disclosed in U.S. Pat. No. 5,573,269. The foot well sensor elements are used to detect where the feet of an occupant are being supported in the foot well. Since a proportion of the weight of an occupant is supported by an occupant's feet, the detected position of the feet can be used to correct the detected occupant's weight.

One object of the present invention is to provide an improved occupant detection system that achieves better reliability and accuracy of occupant detection with little complexity.

The occupant detection system according to the invention for a motor vehicle comprises first and second occupant detection devices, with the second occupant detection device comprising a first electrode arranged in the seat and a second electrode arranged in the foot well. An electrical coupling variable is detected by means of an electrical field which is applied between the electrodes, and is used to determine a variable which characterizes an occupant. An occupant or a part of an occupant interacts with the electrical field between the electrodes. The influence of the occupant on the field can be detected by means of an electrical circuit which is provided for this purpose, and can be evaluated to determine a variable which can be predetermined and characterizes the occupant.

By way of example, a dielectric constant, a field strength, a displacement field, oscillator mistuning or some other electrical or magnetic variable can be detected as the coupling variable.

For example, the electrical capacitance of the electrodes is changed by the introduction of a dielectric between the two electrodes. In this case, the capacitance depends in particular on the shape, size and physical arrangement of the dielectric (that is, of the occupant), between the electrodes. The dielectric constant of an occupant may be assumed to be the same as that of water, owing to the chemical composition of a human being.

The advantage of the occupant detection system according to the invention is that a conclusion about an occupant can be made in a simple manner by means of the combination of the first and of the second occupant detection devices, which conclusion relates not only to one area (for example the seat surface), but also links two areas (that is, the seat surface and the foot well). Such linking makes it possible to avoid detection errors, such as those caused by detection objects that are present in only one of the two areas (seat or foot well). Furthermore, different occupant positions can be detected by means of the second occupant detection system.

The identification confidence of the second occupant protection system is subject to less stringent requirements, since it is intended only as a supplement of the first occupant detection system.

The first occupant detection device is, in particular, a seat occupancy or weight identification device, which is arranged in the seat.

The first and the second occupant detection systems can evaluate the detected variables separately, and combine the two results, or else can supply the signals to a common evaluation algorithm. In particular, both occupant detection systems can be provided for detection of the same variable or variables.

In one advantageous refinement of the occupant detection system, the variable which characterizes an occupant is the leg length, the body size or the age class of the occupant. The length of the legs of the occupant can be deduced by means of the interaction between the occupant and the electrical field between the electrodes. This makes it possible, in particular, to identify relatively small occupants, since their feet do not reach the vehicle floor. The body size of the occupant and his or her age class can be deduced, for which purpose, in particular, a weight identification is used in the seat surface. By linking the information relating to the leg length, the weight and the weight distribution, it is possible to deduce the age class of an occupant with sufficient accuracy and reliability. In particular, it is possible to distinguish between a child and an adult, and a child seat identification can additionally be used for this purpose. A further distinguishing option is that between the two age classes of baby/small child and child/youth.

Furthermore, additional occupant detection devices can be integrated in the occupant detection system according to the invention, and/or further parameters can be used for occupant detection, in order to improve the accuracy and reliability even further.

In one advantageous embodiment of the occupant detection system according to the invention, the first electrode, which is arranged in the seat, is a part of the first occupant detection device (that is, it is integrated in it). The electrode may, for example, be vapor-deposited in the form of a metallic sheet onto a part of the first occupant detection device, or may be produced together with it in the same production process with a conductor track structure for the first occupant detection device, for example by screen printing. The electrode can be laminated into the first occupant detection device, can be bonded to it, or can be fitted in some other way. The—at least physical—integration of the electrode in the first occupant detection device reduces the installation complexity for installation in the vehicle seat, and the wiring complexity for installation of the seat in the vehicle.

It is particularly advantageous that the first electrode be not only physically connected to the first occupant detection device but also a functional component of it, further reducing the cost of the second occupant detection device. For example, the electrode may be part of a supply line or signal line to a weight detection mat, or the antenna structure of a child seat identification device.

In a similar manner, it is advantageous for the second electrode of the second occupant detection device to be a part of a third occupant detection device which is arranged in the foot well. A third such sensor device may be a pressure-sensitive or weight-sensitive mat, analogously to the seat surface sensor system. In this way, foot pressure, the supporting weight of a foot or the foot position could be detected and, for example, an occupant out-of-position identification can be further improved by means of the system according to the invention. A third occupant detection device can also be provided for verification and/or for improving the reliability of the result from the two other occupant detection devices.

Alternatively, the first or the second electrode may also be part of another device of the vehicle, in order to reduce the installation complexity. However, this has the disadvantage that the installation is carried out together with a device which is functionally independent (that is, it carries out a completely different function).

In order to obtain an occupant detection system whose detection performance is as good as possible, and at the same time consumes as little energy as possible, both electrodes are arranged close to the surface. In particular, the first electrode is arranged in the area up to a few centimeters, for example up to about 2 cm, below the seat surface, and/or the second electrode is arranged immediately under the foot well floor covering.

An electrical constant field or alternating field can be produced in order to detect the interaction between an occupant and the electrical field which is applied between the electrodes. In particular, a relatively high-frequency electrical alternating field can be used, at a frequency in the kHz range or in the MHz range.

Other objects, advantages and novel features of the present invention will become apparent from the following detailed description of the invention when considered in conjunction with the accompanying drawings.

BRIEF DESCRIPTION OF THE DRAWINGS

The single FIGURE depicts one advantageous embodiment of the occupant detection system according to the invention.

DETAILED DESCRIPTION OF THE DRAWINGS

The FIGURE shows a part of a vehicle interior with a vehicle seat 1, comprising a seat part 2, a back rest 3 and a head support part 4. An occupant 5 is shown on the vehicle seat 1, with a dashboard mount 6 in front of the occupant. A first occupant detection device 11 is arranged in the seat part 2 of the vehicle seat 1. A first electrode 10 is integrated in this first occupant detection device 11 and is connected to an evaluation device 13 by means of an electrical conductor 12. A second electrode 15 arranged in the foot well is likewise connected to the evaluation device 13 by means of an electrical conductor. The two electrodes and the signal evaluation device 13 are components of a second occupant detection device, which produces an electrical field between the electrodes. The interaction between an occupant 5 and the electrical field is detected by means of the evaluation device 13, and this is used to determine a variable which characterizes the occupant 5, for example his or her approximate body size. Together with the result from a weight determination process, which is carried out, for example, by means of the first occupant determination device 11, the occupant can be classified for initiation of restraint systems. In particular, the occupant can be associated with one of the occupant classes small child, child, youth, small adult and large adult.

In particular, small children whose feet do not reach the vehicle floor when they are seated on the vehicle seat 1 or in a child seat located on the vehicle seat 1, can be reliably detected by means of the occupant detection system according to the invention.

The second electrode 15 is advantageously arranged in or directly underneath a floor covering in the foot well. The first electrode and the second occupant detection device may alternatively also be arranged in the back rest 2, or in some other part of the vehicle seat 1. As noted previously, the second electrode 15 may be part of a third occupant detection device 16, such as a pressure or weight sensitive mat.

The first occupant detection device 11 may also be a child seat identification device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An occupant detection system for a motor vehicle, comprising:

a first occupant detection device which is arranged in a vehicle seat; and a second occupant detection device; wherein the second occupant detection device comprises a first electrode arranged in the vehicle seat and a second electrode arranged in a foot well associated with the vehicle seat;

an electrical coupling variable associated with the two electrodes is determined by means of an electrical field applied between the electrodes; and the electrical coupling variable and a variable which is determined by the first occupant detection device are used to determine whether the vehicle occupant is a child, whose legs do not extend to the vehicle floor, or whether the vehicle occupant is an occupant whose legs extend to a vehicle floor in said foot well.

2. The occupant detection system according to claim 1, wherein the electrical coupling variable is an electrical capacitance, which is associated with a capacitor formed by the first electrode arranged in the seat and the second electrode arranged in the foot well.

3. The occupant detection system according to claim 1, wherein the first electrode, which is arranged in the seat, is a part of the first occupant detection device.

4. The occupant detection system according to claim 3, wherein the second electrode of the second occupant detection device is a part of a third occupant detection device, which is arranged in the foot well.

5. The occupant detection system according to claim 3, wherein the first electrode is arranged in a region within approximately 2 cm below the seat surface.

6. A method for determining whether a vehicle occupant is a child whose legs do not extend to the floor of the vehicle, said method comprising:

providing a first occupant detection device arranged in a seat of said vehicle;

providing a second occupant detection device comprising a first electrode arranged in the vehicle seat and a second electrode arranged in a foot well associated with the vehicle seat;

applying an electric field between the two electrodes of the second occupant detection device;

determining a coupling variable associated with the two electrodes by sensing the electric field;

using the electric coupling variable and a variable determined by the first occupant detection device to determine the size of an occupant of the vehicle seat.

7. The method according to claim 6, wherein the electrical coupling variable is an electrical capacitance, which is associated with a capacitor formed by the first electrode arranged in the seat and the second electrode arranged in the foot well.

8. The method according to claim 6, wherein the first electrode, which is arranged in the seat, is a part of the first occupant detection device.

9. The method according to claim 8, wherein the second electrode of the second occupant detection device is a part of a third occupant detection device, which is arranged in the foot well.

10. The method according to claim 8, wherein the first electrode is arranged in a region within about 2 cm below the seat surface.

11. An occupant detection system for a vehicle, comprising:

a first occupant detection device arranged in a vehicle seat;

a second occupant detection device comprising a first electrode arranged in the vehicle seat and a second electrode arranged in a floor well associated with the vehicle seat;

an evaluation device, including means for generating an electric field between said first and second electrodes, and means for detecting an interaction between said electric field and a body of an occupant of said seat, by determining a value of an electric coupling variable that is indicative of electric coupling between said first and second electrodes, which electric coupling variable characterizes said body based on said interaction;

wherein, the electric coupling variable is used with a variable determined by said first occupant detection device, to determine whether the vehicle occupant's legs extend to a floor of the vehicle in said foot well.

12. The occupant detection system according to claim 11, wherein the first electrode forms an electric component that is common to both the first and second occupant detection devices.

13. The occupant detection system according to claim 12, wherein the second electrode forms an electric component that is common to both the second occupant detection device and a third occupant detection device.

14. The occupant detection system according to claim 12, wherein each of said first and third occupant detection devices comprises one of a pressure sensitive device and a weight sensitive device.

15. An occupant detection system for a motor vehicle, comprising:

a first electrode arranged in the vehicle seat;

a second electrode arranged in a foot well associated with the vehicle seat; wherein, an electrical coupling variable associated with the two electrodes is determined by means of an electrical field applied between the electrodes; and the electrical coupling variable is used to determine whether an occupant of the vehicle seat is an occupant whose legs do not extend to a vehicle floor in said foot well, or whether the vehicle occupant is an occupant whose legs do extend to the vehicle floor in said foot well.

16. The occupant detection system according to claim 15, wherein the electrical coupling variable is an electrical capacitance, which is associated with a capacitor formed by the first electrode arranged in the seat and the second electrode arranged in the foot well.

17. The occupant detection system according to claim 16, wherein the first electrode is arranged in a region within approximately 2 cm below the seat surface.

* * * * *